US012586876B2

(12) United States Patent
Suzuki et al.

(10) Patent No.: US 12,586,876 B2
(45) Date of Patent: *Mar. 24, 2026

(54) TERMINAL FOR SECONDARY BATTERY AND METHOD FOR MANUFACTURING TERMINAL FOR SECONDARY BATTERY

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,355

(22) Filed: Aug. 17, 2021

(65) Prior Publication Data

US 2022/0085468 A1 Mar. 17, 2022

(30) Foreign Application Priority Data

Sep. 17, 2020 (JP) ................................. 2020-155912

(51) Int. Cl.
H01M 50/566 (2021.01)
H01M 10/0525 (2010.01)
(Continued)

(52) U.S. Cl.
CPC ....... H01M 50/566 (2021.01); H01M 50/103 (2021.01); H01M 50/209 (2021.01);
(Continued)

(58) Field of Classification Search
CPC ............. H01M 50/566; H01M 50/502; H01M 50/553; H01M 50/562; H01M 50/564; H01M 50/567; H01M 50/543
See application file for complete search history.

(56) References Cited

U.S. PATENT DOCUMENTS

2002/0061438 A1 5/2002 Inoue et al.
2003/0170535 A1 9/2003 Watanabe et al.
(Continued)

FOREIGN PATENT DOCUMENTS

CN 102544423 A 7/2012
CN 103227311 A 7/2013
(Continued)

OTHER PUBLICATIONS

Dhara, S., Das, A.; "Impact of ultrasonic welding on multi-layered Al—Cu joint for electric vehicle battery applications: A layer-wise microstructural analysis" Materials Science & Engineering A, Jun. 21, 2020, 791, 139795, p. 1-18 (Year: 2020).*
(Continued)

*Primary Examiner* — Jonathan G Leong
*Assistant Examiner* — Drew C Newman
(74) *Attorney, Agent, or Firm* — Finnegan, Henderson, Farabow, Garrett and Dunner, LLP

(57) ABSTRACT

Provided is a method for manufacturing an electrode terminal formed of different kinds of metals excellent injunction strength. The manufacturing method of a terminal herein disclosed includes the following steps of: preparing a first member and a second member each made of a metal and forming the terminal, with the first member being formed in a sheet shape and having at one surface thereof a concave part for allowing a part of the second member to be fitted therein, and with the second member having a flange part to be accommodated in the concave part; and fixing the first member and the second member to each other by ultrasonic pressure contact, with the ultrasonic pressure contact being performed by applying an ultrasonic wave vibration while applying a pressure in a direction of stacking of the first member and the second member in a state where the flange part of the second member is arranged in the concave part of
(Continued)

the first member, thereby extending the flange part, and bringing a part of the extended flange part into pressure contact with an inner wall surface of the concave part.

7 Claims, 9 Drawing Sheets

(51) Int. Cl.
| | |
|---|---|
| *H01M 50/103* | (2021.01) |
| *H01M 50/147* | (2021.01) |
| *H01M 50/209* | (2021.01) |
| *H01M 50/502* | (2021.01) |
| *H01M 50/564* | (2021.01) |

(52) U.S. Cl.
CPC ....... *H01M 50/502* (2021.01); *H01M 50/564* (2021.01); *H01M 10/0525* (2013.01); *H01M 50/147* (2021.01)

(56) References Cited

U.S. PATENT DOCUMENTS

| | | | |
|---|---|---|---|
| 2005/0100785 A1 | 5/2005 | Enomoto et al. | |
| 2011/0052970 A1 | 3/2011 | Kurata et al. | |
| 2011/0081572 A1 | 4/2011 | Byun et al. | |
| 2011/0104566 A1 | 5/2011 | Byun et al. | |
| 2011/0195296 A1 | 8/2011 | Kim et al. | |
| 2011/0244309 A1 | 10/2011 | Byun et al. | |
| 2012/0148908 A1 | 6/2012 | Ito | |
| 2012/0214030 A1* | 8/2012 | Guen | H01M 50/147 |
| | | | 429/61 |
| 2013/0196192 A1 | 8/2013 | Harada et al. | |
| 2013/0224536 A1 | 8/2013 | Hattori et al. | |
| 2014/0178746 A1 | 6/2014 | Ono | |
| 2015/0086844 A1 | 3/2015 | Masuda | |
| 2015/0086867 A1 | 3/2015 | Oda et al. | |
| 2015/0136839 A1 | 5/2015 | Kanryo et al. | |
| 2015/0140391 A1 | 5/2015 | Sakate et al. | |
| 2015/0183052 A1 | 7/2015 | Murakami et al. | |
| 2015/0221926 A1 | 8/2015 | Yoshitake et al. | |
| 2015/0243955 A1 | 8/2015 | Kang | |
| 2015/0295221 A1 | 10/2015 | Urano et al. | |
| 2015/0318519 A1* | 11/2015 | Tsutsumi | H01G 9/048 |
| | | | 429/163 |
| 2015/0380712 A1 | 12/2015 | Tsunaki et al. | |
| 2016/0043353 A1 | 2/2016 | Tsutsumi et al. | |
| 2016/0118641 A1 | 4/2016 | Oda et al. | |
| 2016/0254517 A1 | 9/2016 | Tsunaki et al. | |
| 2016/0372722 A1* | 12/2016 | Yoshida | H01M 50/528 |
| 2017/0054131 A1 | 2/2017 | Yokota et al. | |
| 2017/0229700 A1 | 8/2017 | Matsumoto et al. | |
| 2018/0085847 A1 | 3/2018 | Sato | |
| 2018/0207745 A1 | 7/2018 | Hori et al. | |
| 2018/0294465 A1 | 10/2018 | Nagai et al. | |
| 2018/0331348 A1 | 11/2018 | Kobayashi | |
| 2018/0358603 A1 | 12/2018 | Nakayama et al. | |
| 2019/0044107 A1 | 2/2019 | Ito | |
| 2019/0054562 A1 | 2/2019 | Miyashiro et al. | |
| 2019/0221791 A1 | 7/2019 | Wakimoto | |
| 2019/0273240 A1 | 9/2019 | Hagino et al. | |
| 2020/0035964 A1 | 1/2020 | Zhang et al. | |
| 2020/0075923 A1 | 3/2020 | Takabayashi et al. | |
| 2020/0091492 A1* | 3/2020 | Guen | H01M 50/566 |
| 2020/0243868 A1 | 7/2020 | Takabayashi et al. | |
| 2020/0358071 A1 | 11/2020 | Kawanishi | |
| 2021/0175510 A1 | 6/2021 | Yoneda et al. | |
| 2022/0085463 A1 | 3/2022 | Suzuki et al. | |
| 2022/0085467 A1 | 3/2022 | Suzuki et al. | |
| 2023/0039284 A1 | 2/2023 | Sakurai et al. | |

FOREIGN PATENT DOCUMENTS

| | | |
|---|---|---|
| CN | 105830253 A | 8/2016 |
| CN | 106575741 A | 4/2017 |
| CN | 107848064 A | 3/2018 |
| CN | 110048065 A | 7/2019 |
| CN | 209880722 U | 12/2019 |
| CN | 110875462 A | 3/2020 |
| CN | 111183536 A | 5/2020 |
| CN | 112909345 A | 6/2021 |
| EP | 2490282 A1 | 8/2012 |
| EP | 3 062 370 A1 | 8/2016 |
| EP | 3179537 A1 | 6/2017 |
| EP | 3 467 906 A1 | 4/2019 |
| EP | 3972042 A1 | 3/2022 |
| FR | 2 732 417 A1 | 10/1996 |
| JP | 07-224944 A | 8/1995 |
| JP | 09-219204 A | 8/1997 |
| JP | 11-283588 A | 10/1999 |
| JP | 2000-082487 A | 3/2000 |
| JP | 2000-082847 A | 3/2000 |
| JP | 2000-164195 A | 6/2000 |
| JP | 2001-126706 A | 5/2001 |
| JP | 2001-357834 A | 12/2001 |
| JP | 2004-220963 A | 8/2004 |
| JP | 2005-019213 A | 1/2005 |
| JP | 2005-285406 A | 10/2005 |
| JP | 2007-026945 A | 2/2007 |
| JP | 2009-087728 A | 4/2009 |
| JP | 2009-110808 A | 5/2009 |
| JP | 2011-077039 A | 4/2011 |
| JP | 2011-124024 A | 6/2011 |
| JP | 2011-210725 A | 10/2011 |
| JP | 2012-174452 A | 9/2012 |
| JP | 2012-190636 A | 10/2012 |
| JP | 2013-075297 A | 4/2013 |
| JP | 2013093287 A | 5/2013 |
| JP | 2013-157156 A | 8/2013 |
| JP | 2014-127277 A | 7/2014 |
| JP | 2014-146498 A | 8/2014 |
| JP | 2014-526962 A | 10/2014 |
| JP | 2015-011785 A | 1/2015 |
| JP | 2015-030007 A | 2/2015 |
| JP | 2015-056273 A | 3/2015 |
| JP | 2015-059826 A | 3/2015 |
| JP | 2015060730 A * | 3/2015 |
| JP | 2015-088443 A | 5/2015 |
| JP | 2015-88464 A | 5/2015 |
| JP | 2015-099759 A | 5/2015 |
| JP | 2015-153521 A | 8/2015 |
| JP | 2015-162460 A | 9/2015 |
| JP | 2016-018675 A | 2/2016 |
| JP | 2016-058215 A | 4/2016 |
| JP | 2016-081873 A | 5/2016 |
| JP | 2016-085961 A | 5/2016 |
| JP | 2016-115458 A | 6/2016 |
| JP | 2016-129125 A | 7/2016 |
| JP | 2016-132131 A | 7/2016 |
| JP | 2016-192285 A | 11/2016 |
| JP | 2016-207433 A | 12/2016 |
| JP | 2016-207510 A | 12/2016 |
| JP | 2017-027819 A | 2/2017 |
| JP | 6087413 | 2/2017 |
| JP | 2017-111896 A | 6/2017 |
| JP | 6216368 B2 | 10/2017 |
| JP | 2017-228418 A | 12/2017 |
| JP | 2018-181552 A | 11/2018 |
| JP | 2019-009045 A | 1/2019 |
| JP | 2020-107473 A | 7/2020 |
| JP | 2020102320 A | 7/2020 |
| JP | 2020-119874 A | 8/2020 |
| KR | 10-2016-0107938 A | 9/2016 |
| KR | 10-2019-0124039 A | 11/2019 |
| WO | WO 2012/118014 A1 | 9/2012 |
| WO | WO 2012/169055 A1 | 12/2012 |
| WO | WO 2013/013083 A2 | 1/2013 |
| WO | WO 2014/042005 A1 | 3/2014 |
| WO | WO 2014/103874 A1 | 7/2014 |
| WO | WO 2015/060175 A1 | 4/2015 |

(56) References Cited

FOREIGN PATENT DOCUMENTS

| WO | WO 2016/020996 A1 | 2/2016 |
| WO | WO 2017/141694 A1 | 8/2017 |

OTHER PUBLICATIONS

English translation of Suzuki et al. JP-2015060730-A (Year: 2015).*

English translation of Hiroshi et al. JP-2016018675-A. (Year: 2016).*

Ni et al., "Dissimilar Joining of Aluminum to Copper Using Ultrasonic Welding" Materials and Manufacturing Processes, 2016, 31, 2091-2100. (Year: 2016).*

Office Action issued in U.S. Appl. No. 17/409,990 on Aug. 30, 2022.

Office Action issued in U.S. Appl. No. 17/404,616 on Feb. 1, 2023.

Notice of Allowance dated Mar. 8, 2023, issued in U.S. Appl. No. 17/409,990.

Schmidt et al. "Joining of lithium-ion batteries using laser beam welding: Electrical losses of welded aluminum and copper joints", ICALEO 2012, p. 915-923.

Office Action dated Feb. 16, 2023, issued in U.S. Appl. No. 17/876,054.

Office Action dated Feb. 22, 2023, issued in U.S. Appl. No. 17/404,454.

Final Office Action dated Jun. 15, 2023, issued in U.S. Appl. No. 17/404,616.

Final Office Action dated Jun. 15, 2023, issued in U.S. Appl. No. 17/876,054.

Final Office Action dated Aug. 31, 2023, in U.S. Appl. No. 17/404,454.

Advisory Action Before the Filing of an Appeal Brief dated Oct. 12, 2023, in U.S. Appl. No. 17/876,054.

Office Action dated Oct. 13, 2023, in U.S. Appl. No. 17/404,616.

Office Action issued in U.S. Appl. No. 17/404,454 dated Mar. 13, 2024.

Zhixiang, C., "Welding Process of Ships," Harbin Institute of Technology Press, Mar. 31, 2015, pp. 149-150.

Office Action in CN 202111080245.6, dated Jun. 28, 2024.

Final Office Action in U.S. Appl. No. 17/404,454, dated Jul. 19, 2024.

"EAA Aluminum Automotive Manual-Joining," 8. Metal Joining, The Aluminum Automotive Manual, European Aluminium Association, 2015, pp. 1-66.

"Mechanical Manufacturing Inspection Technique, Thermal Processing Section," pp. 487-488, Mar. 1988.

Office Action in CN 202111086085.6, dated Mar. 20, 2024.

Notice of Allowance and Notice of Allowability in U.S. Appl. No. 17/876,054, dated Apr. 15, 2024.

Notice of Allowance and Notice of Allowability in U.S. Appl. No. 17/404,616, dated May 22, 2024.

Office Action issued in U.S. Appl. No. 17/876,054 dated Jan. 11, 2024.

Final Office Action issued in U.S. Appl. No. 17/404,616 dated Feb. 16, 2024.

Zhang, Zhigiang et al., "Effects of Ultrasonic Assisted Friction Stir Welding on Flow Behavior, Microstructure and Mechanical Properties of 7N01-T4 Aluminum Alloy Joints," Journal of Materials Science & Technology, vol. 43 (2020), pp. 1-13.

Non-final office action issued in U.S. Appl. No. 17/404,454 on Nov. 19, 2024.

Non Final Office Action issued in U.S. Appl. No. 17/861,692, dated May 6, 2025.

Final Office Action issued in U.S. Appl. No. 17/404,454, dated May 19, 2025.

Notice of Allowance issued in U.S. Appl. No. 17/861,692, dated Oct. 22, 2025.

Examiner's Answer issued in U.S. Appl. No. 17/404,454, dated Feb. 2, 2026.

* cited by examiner

70

56R

58F

71

70

56R

58F

71

56R

58F

56R

58F

TERMINAL FOR SECONDARY BATTERY AND METHOD FOR MANUFACTURING TERMINAL FOR SECONDARY BATTERY

CROSS REFERENCE TO RELATED APPLICATIONS

The present application claims the priority based on Japanese Patent Application No. 2020-155912 filed on Sep. 17, 2020, the entire contents of which are incorporated in the present specification by reference.

BACKGROUND

The present disclosure relates to a terminal to be used for an electrode terminal of a secondary battery, and a manufacturing method thereof. More particularly, the present disclosure relates to a terminal formed of two kinds of metals and a manufacturing method thereof.

A nonaqueous electrolyte secondary battery such as a lithium ion secondary battery is more lightweight and has a higher energy density as compared with existing batteries. For this reason, in recent years, the nonaqueous electrolyte secondary battery has been used as a power supply to be mounted on a vehicle that uses electricity as a driving source, or a power supply to be mounted on electric products such as a personal computer and a portable terminal. Particularly, an assembled battery including as a single cell a closed type lithium ion secondary battery, which is lightweight and provides a high energy density, has been preferably used as a high output power supply for driving a vehicle such as an electric vehicle (EV), a plug-in hybrid vehicle (PHV), or a hybrid vehicle (HV).

Such a closed type secondary battery forming an assembled battery includes a battery case for accommodating an electrode body, and electrode terminals of a positive electrode and a negative electrode. One end of the electrode terminal forming the secondary battery is exposed to the outside of the battery case, and the other end is connected with the electrode body inside the battery case via a collector.

A plurality of such secondary batteries (which will be hereinafter also referred to as "single cells") are arrayed along a prescribed array direction, and the electrode terminal of one single cell is electrically connected with another single cell via a bus bar, thereby constructing an assembled battery.

Generally, the electrode terminals of the positive electrode and the negative electrode of the lithium ion secondary battery are formed of different materials. When a bus bar including the same kind of material as that for one electrode terminal is used for connection between single cells, the conduction and the junction strength between one electrode terminal and the bus bar become relatively lower than those between the other electrode terminal and the bus bar.

In order to establish a conduction between the electrode terminal and the bus bar, Japanese Patent Application Publication No. 2016-85961 discloses a technology of forming an electrode terminal using a cladding material matched to the metal species forming the bus bar and the collector terminal. Further, Japanese Patent Application Publication No. 2011-124024 discloses a technology of joining connection terminals including different kinds of metals by ultrasonic welding, followed by crimping, thereby improving the conduction and the junction strength between the components.

SUMMARY

Incidentally, the electrode terminal formed using the cladding material as described in Japanese Patent Application Publication No. 2016-85961 is generally high in manufacturing cost. Further, as described in Japanese Patent Application Publication No. 2011-124024, by the method in which the connection terminals are joined therebetween by ultrasonic welding, followed by crimping, the components may be deformed by the crimping. The technology for joining different kinds of metals to the electrode terminal has been required to be developed so as to reduce the cost, and to have a sufficient junction strength.

The present disclosure has been made in view of such points. It is an object of the present disclosure to provide a method for manufacturing an electrode terminal formed of different kinds of metals excellent injunction strength. In addition, it is another main object of the present disclosure to provide a terminal manufactured by such a method, and a battery using the terminal.

The present inventors found the following. When an electrode terminal formed of two kinds of metals is manufactured by joining with ultrasonic joining, one metal is drawn to and is brought into pressure contact with the other metal due to the pressure and the vibration applied to the two kinds of metals, resulting in the formation of the crimped structure.

It has been found that the connection terminal manufactured by such a method attains favorable conduction due to metal joining between two kinds of metals, and moreover due to a crimped structure thereof, whereby joining is established with a sufficient strength between a first member and a second member.

The method for manufacturing a terminal herein disclosed is a method for manufacturing a terminal forming any of a positive electrode and a negative electrode of a secondary battery. The method includes the following steps of:

preparing a first member and a second member each made of a metal and forming the terminal, with the first member being formed in a sheet shape and having at one surface thereof a concave part for allowing a part of the second member to be fitted therein, and with the second member having a flange part to be accommodated in the concave part; and fixing the first member and the second member to each other by ultrasonic pressure contact, with the ultrasonic pressure contact being performed by applying an ultrasonic wave vibration while applying a pressure in a direction of stacking of the first member and the second member in a state where the flange part of the second member is arranged in the concave part of the first member, thereby extending the flange part, and bringing a part of the extended flange part into pressure contact with an inner wall surface of the concave part.

With such a manufacturing method, it is possible to manufacture a terminal including a connection terminal in which the first member and the second member are subjected to ultrasonic joining therebetween, thereby establishing a favorable conduction therebetween, and have a crimped structure, so that the first member and the second member are joined with each other with a sufficient strength.

In one embodiment, the first member and the second member are formed of mutually different metals.

With such a manufacturing method, it is possible to manufacture a terminal with favorable junction strength and conduction even though different metal species are included therein.

In another embodiment, the first member is formed of aluminum or an alloy mainly containing aluminum, and the second member is formed of copper or an alloy mainly containing copper.

With such a manufacturing method, it is possible to manufacture a terminal to be brought into favorable conduction with the bus bar including aluminum or an alloy mainly containing aluminum.

As a still other aspect of the technology herein disclosed, a terminal forming any of the positive electrode and the negative electrode of the secondary battery is provided. The terminal includes a first member and a second member each made of a metal. The first member is formed in a sheet shape, and has a concave part at one surface thereof, and the second member has a flange part to be accommodated in the concave part of the first member. Herein, the first member and the flange part of the second member are at least partially joined with each other by metal joining, and an end of the flange part is crimped with an inner wall surface of the concave part not via a through hole.

For the terminal having such a configuration, the first member and the second member are subjected to ultrasonic wave joining, thereby establishing a favorable conduction therebetween, and have a crimped structure, thereby joining the first member and the second member therebetween with a sufficient strength.

In one preferable embodiment, the metal joining is caused at a position closer to a center of the flange part than to a part that has been crimped.

With such a configuration, the foregoing effects can be exerted better.

In one embodiment, an interface of the metal joining present between the first member and the second member has a joint surface caused by ultrasonic joining.

With such a configuration, it is possible to establish a favorable conduction between the first member and the second member.

In another embodiment, the first member and the second member are formed of mutually different metals.

With such a configuration, even the terminal including different metal species can ensure the junction strength and the conduction.

In a still other embodiment, the first member is formed of aluminum or an alloy mainly containing aluminum, and the second member is formed of copper or an alloy mainly containing copper.

With such a configuration, the electrode terminal including the terminal and external connection components such as the bus bar including aluminum or an alloy mainly containing aluminum can be brought into favorable conduction with each other.

As a furthermore aspect of the technology herein disclosed, a secondary battery is provided which includes: an electrode body including a positive electrode and a negative electrode, a battery case accommodating in the inside thereof the electrode body; and a positive electrode terminal and a negative electrode terminal electrically connected with the positive electrode and the negative electrode in the electrode body, respectively. At least one of the positive electrode terminal and the negative electrode terminal includes the terminal herein disclosed.

As a further aspect of the technology herein disclosed, an assembled battery is provided which includes a plurality of single cells electrically connected with one another and arrayed therein. The secondary battery including the terminal herein disclosed is used as at least one of the positive electrode terminal and the negative electrode terminal as each of the plurality of single cells.

In a still other embodiment, for the respective plurality of single cells, a positive electrode terminal of one single cell is electrically connected with a negative electrode terminal of another single cell by a prescribed bus bar, and the bus bar is formed of the same metal as a metal forming the first member of the terminal.

With such a configuration, the assembled battery in which single cells are favorably connected one another can be provided.

DETAILED DESCRIPTION

Below, appropriately referring to the accompanying drawings, a terminal herein disclosed, a secondary battery including the terminal, an assembled battery including a single cell having the terminal as a constituent element, and one embodiment of the method for manufacturing the terminal will be described in details by taking a rectangular lithium ion secondary battery including a wound electrode body as an example. The following embodiments naturally should not be construed as particularly limiting the technology herein disclosed.

The secondary battery herein disclosed is not limited to the lithium ion secondary battery described below. For example, a sodium ion secondary battery, a magnesium ion secondary battery, or a lithium ion capacitor included in a so-called physical battery is also the example included in the secondary battery herein referred to. Further, herein, a description will be given using a lithium ion secondary battery including a wound electrode body having a structure in which a plurality of electrode bodies of positive electrodes and negative electrodes are wound via separators. Not limited to such a configuration, the electrode body may be configured such that a plurality of electrode bodies of positive electrodes and negative electrodes are stacked via separators.

Incidentally, matters necessary for executing the present disclosure, except for matters specifically referred to in the present specification can be grasped as design matters of those skilled in the art based on the related art in the present field. The present disclosure can be executed based on the contents disclosed in the present specification, and the technical common sense in the present field.

In the following drawings, the members/parts producing the same effect are given the same reference sign and numeral, and the overlapping description thereon may be omitted or simplified. The dimensional relation of length, width, or the like in each following drawing does not necessarily reflect the actual dimensional relation.

When the numerical value range is described as A to B (where A or B is a given numerical value) in the present specification, it is assumed that the range means A or more and B or less. Further, the term "main body" in the present specification represents the component accounting for 70% by weight or more based on the total amount of all the components.

Figure 1:
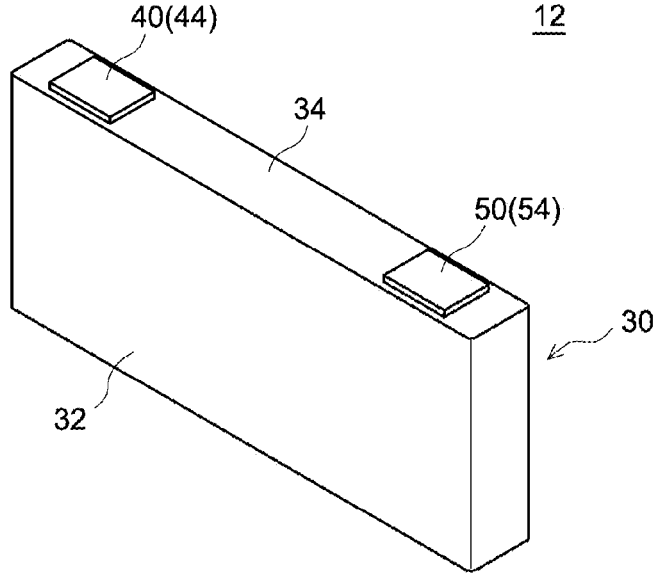
FIG. 1 is a perspective view schematically showing the outline of a secondary battery using a terminal in accordance with one embodiment.

FIG. 1 is a perspective view schematically showing the outline of a secondary battery using a terminal in accordance with one embodiment.

A secondary battery 12 is a secondary battery capable of being repeatedly charged and discharged, and is, for example, a lithium ion secondary battery. A detailed description on the structure is omitted. The secondary battery 12 herein disclosed includes an electrode body having a structure in which a positive electrode and a negative electrode are stacked one on another via a separator in the inside of a battery case 30. Such an electrode body is accommodated together with a nonaqueous electrolyte (not shown) in a battery case main body 32. The edge part of a lid body 34 is sealed while the inside being reduced in pressure by welding or the like, resulting in a hermetically sealed state. For the battery case 30, a metal material which is lightweight, and has good thermal conductivity such as aluminum is used. The shape of the battery case 30 is not limited to the rectangular shape as described in FIG. 1, and may be, for example, a cylindrical shape.

The battery case 30 includes a positive electrode terminal 40 and a negative electrode terminal 50 to be electrically connected with the electrode body in the inside of the battery case, and to be connected with external connection components via a bus bar or the like. At least one of the positive electrode terminal 40 and the negative electrode terminal 50 has a connection terminal corresponding to the electrode terminal of a positive electrode connection terminal 44 and a negative electrode connection terminal 54.

Incidentally, the shape of the positive electrode terminal 40 and the negative electrode terminal 50 exposed to the outside of the battery case has no particular restriction, and may be a rectangular shape as shown, and may be, for example, a circular shape including an elliptic shape.

Figure 2:
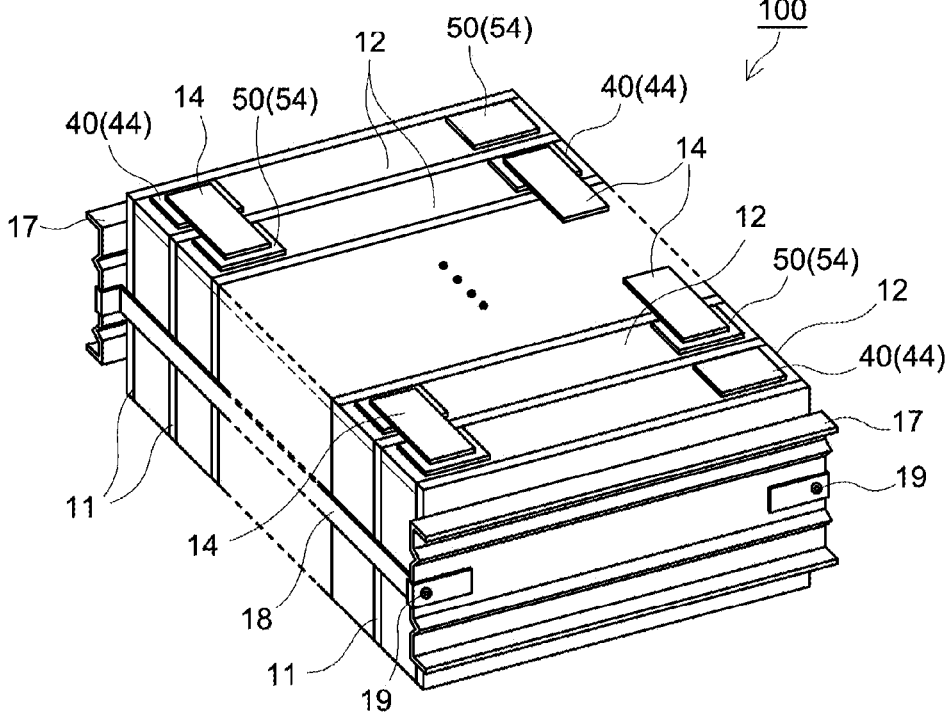
FIG. 2 is a perspective view schematically showing an assembled battery including single cells each using the terminal in accordance with one embodiment.

FIG. 2 is a perspective view schematically showing an assembled battery including single cells using the terminals in accordance with one embodiment.

In an assembled battery 100 including a plurality of single cells 12 arrayed therein shown in FIG. 1, the single cells 12 are arrayed via spacers 11. At further outside of the spacer 11 arranged on the outermost side, a pair of end plates 17 are arranged. These are bound by fastening beam materials 18 mounted for cross-linking the end plates 17, and the end of the fastening beam material 18 is fastened and fixed by a vis screw 19.

The positive electrode terminal 40 and the negative electrode terminal 50 are disposed at the top of each single cell 12. At least one of the positive electrode terminal 40 and the negative electrode terminal 50 has a connection terminal corresponding to the electrode terminal of the positive electrode connection terminal 44 and the negative electrode connection terminal 54.

The positive electrode terminal 40 and the negative electrode terminal 50 are electrically connected with respective adjacent single cells 12 via bus bars 14. As the bus bar 14, a metal having high electric conductivity and high mechanical strength is generally used. For example, aluminum, copper, or the like is used.

The internal structure of a secondary battery using the terminal herein disclosed will be described with reference to FIG. 3.

Figure 3:
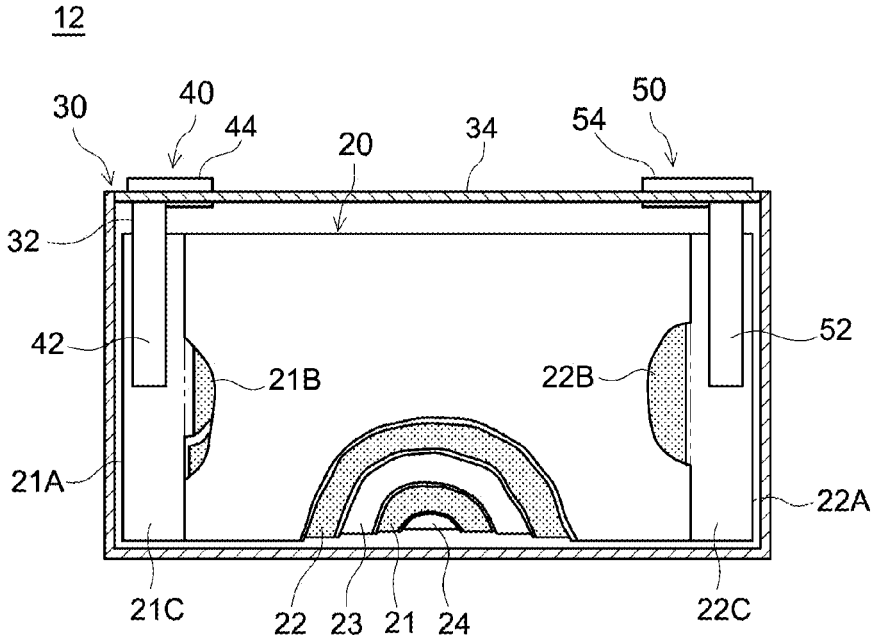
FIG. 3 is a cross sectional view of a broad surface schematically showing the internal structure of the secondary battery using the terminal in accordance with one embodiment.

FIG. 3 is a cross sectional view of the broad surface schematically showing the structure of a secondary battery using the terminal in accordance with one embodiment. The secondary battery 12 includes an electrode body 20, a battery case 30, a positive electrode terminal 40, and a negative electrode terminal 50. Below, respective structures will be described.

The electrode body 20 is a power generating element accommodated in the inside of the battery case 30 while being covered with an insulating film or the like not shown. The electrode body 20 includes a long sheet-shaped positive electrode 21, a long sheet-shaped negative electrode 22, and long sheet-shaped separators 23 and 24. Such an electrode body 20 is a wound electrode body including the foregoing long sheet-shaped members wound in a stacked manner.

The positive electrode 21 includes a foil-shaped positive electrode collector 21A, and a positive electrode active material layer 21B formed along the longitudinal direction on one surface or each opposite surface of the positive electrode collector 21A. Further, at one side edge part of the electrode body 20 in the width direction of the secondary battery 12, a positive electrode collector exposed part 21C at which the positive electrode active material layer 21B is not formed, and the positive electrode collector 21A is exposed is disposed.

The positive electrode active material layer 21B includes various materials such as a positive electrode active material, a binder, and a conductive material.

As the positive electrode collector terminal 42, for example, aluminum foil is used. As for the materials included in the positive electrode active material layer 21B, those usable in a conventional common lithium ion secondary battery can be used without particular restriction, and do not characterize the present disclosure, and hence will not be described in detail.

The negative electrode 22 includes a foil-shaped negative electrode collector 22A, and a negative electrode active material layer 22B formed along the longitudinal direction on one surface or each opposite surface of the negative electrode collector 22A. Further, at the other side edge part of the electrode body 20 in the width direction, a negative electrode collector exposed part 22C at which the negative electrode active material layer 22B is not formed, and the negative electrode collector 22A is exposed is disposed. As with the positive electrode active material layer 21B, the negative electrode active material layer 22B includes various materials such as a negative electrode active material and a binder.

As the negative electrode collector terminal 52, for example, copper foil is used. As for the materials included in the negative electrode active material layer 22B, those usable in a conventional common lithium ion secondary battery can be used without particular restriction, and do not characterize the present disclosure, and hence will not be described in detail.

The separators 23 and 24 are each interposed between the positive electrode 21 and the negative electrode 22, and prevent the direct contact between the electrodes. Although not shown, a plurality of fine holes are formed at the separators 23 and 24. The fine holes are configured such that electric charge carriers (lithium ions for a lithium ion secondary battery) transfer between the positive electrode 21 and the negative electrode 22.

For the separators 23 and 24, a resin sheet having a desirable heat resistance, or the like is used. As the separators 23 and 24, those usable for a conventional common lithium ion secondary battery can be used without particular restriction, and not characterize the present disclosure, and hence will not be described in detail.

As the nonaqueous electrolyte to be accommodated in the battery case 30, typically, those including a nonaqueous solvent and a support salt, and usable for a conventional common lithium ion secondary battery can be used without particular restriction, and do not characterize the present disclosure, and hence will not be described in details.

Figure 4:
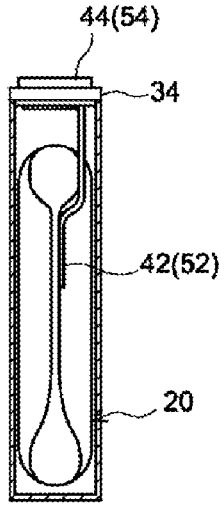
FIG. 4 is a cross sectional view of a narrow surface schematically showing the internal structure of the secondary battery using the terminal in accordance with one embodiment.

In one embodiment, the positive electrode terminal 40 includes a positive electrode connection terminal 44 and a positive electrode collector terminal 42. The positive electrode connection terminal 44 is partially exposed to the outside of the battery case 30 as shown in FIG. 4, and is partially connected with the positive electrode collector terminal 42 in the inside of the battery case 30. The positive electrode collector terminal 42 is arranged in the inside of the battery case 30, and is connected with the positive electrode 21 via the positive electrode collector exposed part 21C.

In one embodiment, the negative electrode terminal 50 includes a negative electrode connection terminal 54 and a negative electrode collector terminal 52. The negative electrode connection terminal 54 is partially exposed to the outside of the battery case 30 as shown in FIG. 4, and is partially connected with the negative electrode collector terminal 52 in the inside of the battery case 30. The negative electrode collector terminal 52 is arranged in the inside of the battery case 30, and is connected with the negative electrode 22 via the negative electrode collector exposed part 22C.

At least one of the positive electrode terminal 40 and the negative electrode terminal 50 has a connection terminal corresponding to the electrode terminal of the positive electrode connection terminal 44 and the negative electrode connection terminal 54. Below, based on the configuration in the case where the negative electrode terminal 50 has the negative electrode connection terminal 54, a detailed description will be given with reference to FIG. 5. The configuration when the positive electrode terminal 40 has the positive electrode connection terminal 44 is the same as the configuration when the negative electrode terminal 50 has the negative electrode connection terminal 54, and hence will not be described in detail.

Figure 5:
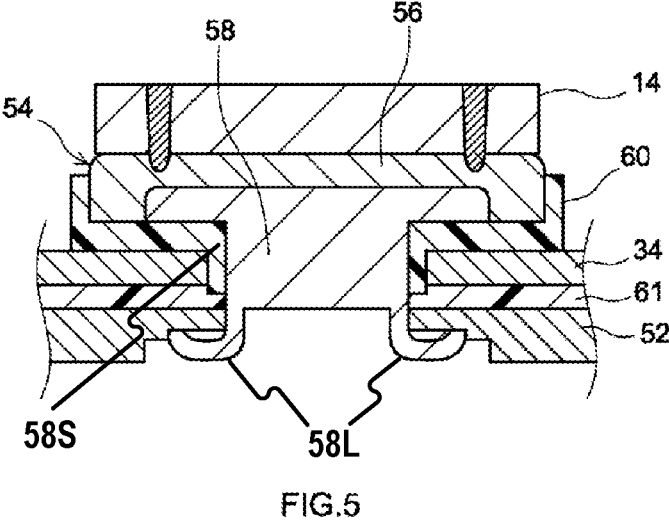
FIG. 5 is an essential part cross sectional view schematically showing the structure of the terminal in accordance with one embodiment.

FIG. 5 is an essential part cross sectional view schematically showing the structure of a terminal in accordance with one embodiment.

The negative electrode terminal 50 includes the negative electrode connection terminal 54 and the negative electrode collector terminal 52. The negative electrode connection terminal 54 includes a first member 56 and a second member 58.

The negative electrode collector terminal 52 is connected with the second member 58 by welding or the like. For the negative electrode collector terminal 52 to be connected with the negative electrode collector 22A, preferably, the same kind of metal as the negative electrode collector 22A is used, and for example, copper is used. As the second member 58 to be connected with the negative electrode collector terminal 52, preferably, the same kind of metal as the negative electrode collector terminal 52 is used, and for example, copper is used.

As shown in FIG. 5, the negative electrode connection terminal 54 is inserted into a lid body 34 having a through hole, and the lid body 34 and the negative electrode connection terminal 54 are insulated therebetween by a gasket 60.

The gasket 60 is formed of a material having insulation property. For example, a fluorine resin such as perfluoro-alkoxy alkane (PFA) is used.

Further, as shown, the negative electrode collector terminal 52 is insulated by an insulator 61. The insulator 61 is formed of a material having an insulation property. For example, a resin material such as polyphenylene sulfide resin (PPS) is used.

A method for manufacturing the foregoing terminal, and a method for manufacturing a secondary battery having the terminal will be described. Below, a description will be given by taking a method for manufacturing a negative electrode terminal as an example. The method for manufacturing a positive electrode terminal is the same as the method for manufacturing a negative electrode terminal, and hence will not be described.

Figure 6:
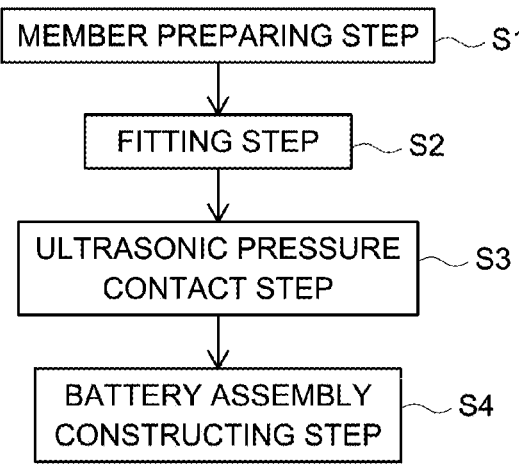
FIG. 6 is a flowchart showing the manufacturing procedure of a secondary battery including the terminal in accordance with one embodiment.

FIG. 6 is a flowchart of a method for manufacturing a secondary battery including a terminal in accordance with one embodiment.

With such a manufacturing method, first, the first member 56 and the second member 58 each made of a metal forming the connection terminal are prepared (S1).

The first member 56 is formed in a sheet shape, and has a concave part 56R in which a part of the second member 58 is fitted at one surface thereof. The second member 58 has a flange part 58F to be fitted with the concave part 56R of the first member 56. The second member 58 further has a shaft part 58S to be inserted into the through hole of the lid body 34.

The second member 58 can have a leg part 58L for being connected with the negative electrode collector terminal 52 by welding or the like, and being fixed to the lid body 34 by crimping or the like. A flange part 58F in a shape spreading in a flange form from the shaft part 58S outward as shown in FIG. 5 is disposed at the end on the side of the shaft part 58S opposed to the concave part 56R.

The dimensions of the concave part 56R of the first member 56 and the flange part 58F of the second member 58 are appropriately set according to the metal species to be used, and the like. The dimensions have no particular restriction unless the effects of the present disclosure are impaired. For example, when the first member 56 is formed of aluminum, and the second member 58 is formed of copper, from the viewpoint of ease for bringing the two members into pressure contact in a later step, the gap between the concave part 56R and the flange part 58F formed when the flange part 58F is fitted to the concave part 56R is preferably 1 mm or less at the maximum. The gap is more preferably 0.8 mm or less, and further preferably 0.5 mm or less. From the viewpoint of ease of fitting, the gap is preferably 0.1 mm or more.

From the viewpoint of ease for bringing the two members into pressure contact in a later step, $D_R$ is more than $0.5 \times T_F$, preferably more than $0.7 \times T_F$, and more preferably more than $0.9 \times T_F$ where $D_R$ represents the depth of the concave part 56R, and $T_F$ represents the thickness of the flange part 58F. Further, $D_R$ is preferably smaller than $1.2 \times T_F$, and more preferably smaller than $1.1 \times T_F$.

The shape of the concave part 56R of the first member 56 has no particular restriction so long as the flange part 58F of the second member 58 is fitted thereto. For example, as shown in FIG. 11, by providing a groove for allowing the end of the flange part 58F to be press-fitted thereinto at the inner wall of the concave part 56R, it is possible to join the first member 56 and the second member 58 more strongly.

Figure 11:
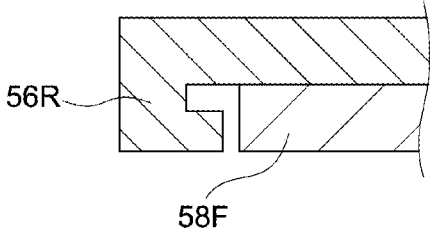
FIG. 11 is a cross sectional view schematically showing the structure of a first component in accordance with one embodiment.

Examples of the shape of the groove may include a rectangular shape in cross section as shown in, for example, FIG. 11, and such a shape as to spread with approach toward the bottom surface at the side surface of the concave part.

The first member 56 and the second member 58 forming the negative electrode connection terminal 54 may be formed of mutually the same kind of metal. For example, when the negative electrode collector 22A and the bus bar 14 are formed of mutually different metals, or in other cases, the first member 56 and the second member 58 preferably are formed of mutually different metals. In that case, it is preferable from the viewpoint of ensuring the conduction that the first member 56 and the bus bar 14 are formed of the same metal, and that the second member 58 and the negative electrode collector 22A are formed of the same metal.

For example, when the bus bar 14 to be connected with the negative electrode connection terminal 54 is formed of aluminum or an alloy mainly containing aluminum, and the negative electrode collector terminal 52 is formed of copper or an alloy mainly containing copper, preferably, the first member 56 is formed of aluminum or an alloy mainly containing aluminum, and the second member 58 is formed of copper or an alloy mainly containing copper.

By thus selecting the metal species of the first member 56 and the second member 58 according to the metal species of the bus bar and the collector terminal, it is possible to improve the conduction and the junction strength of external connection components such as the negative electrode terminal and the bus bar.

Then, the first member 56 and the second member 58 are fitted (S2), and the first member 56 and the second member 58 are fixed to each other by ultrasonic pressure contact (S3).

Figure 7:
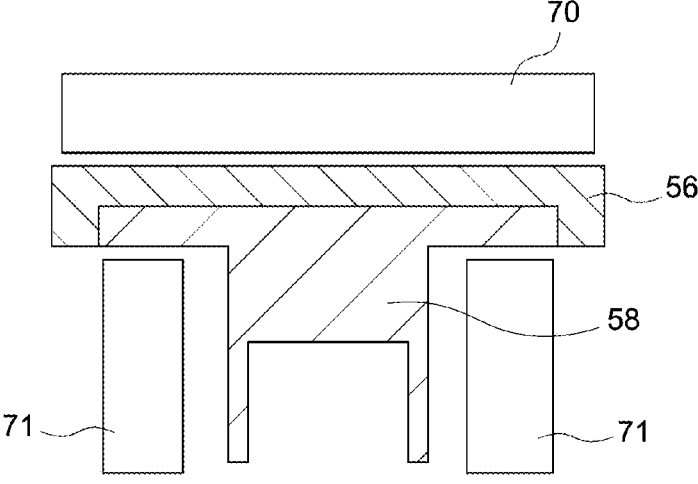
FIG. 7 is a cross sectional view schematically showing the configuration when a first member and a second member are crimped by ultrasonic pressure contact.

As shown in FIG. 7, the flange part 58F of the second member 58 is fitted to the concave part 56R of the first member 56, and is sandwiched by a horn 70 and an anvil 71 (S2). The shape and the like of the horn 70 and the anvil 71 have no restriction so long as the effects of the present disclosure are produced.

In one embodiment, the anvil 71 at which the second member 58 is arranged has such a concave as to allow the shaft part 58S of the second member 58 to be inserted therethrough, and as to allow the flange part 58F to be arranged therein. The horn 70 to be put from the top surface of the first member 56 has such a shape as to be able to apply a pressure with an area similar to the area of each opposing surface of the concave part 56R and the flange part 58F. The shape of the horn 70 is not limited thereto, and can be appropriately selected according to the shapes of the first member 56 and the second member 58. Examples of the shape of the horn 70 are not limited to, but may include a cylindrical shape or such a shape that a plurality of pressurizing parts are arranged equally in the circumferential direction so as to be able to pressurize the surface of the first member 56 top surface supported by the anvil 71 via the flange part 58F.

The horn 70 is mounted at a press including a vibration generator (not shown). The vibration generator is a device for applying a prescribed vibration required for ultrasonic welding to the horn 70. In order to extend the flange part 58F with efficiency, the horn 70 and the anvil 71 are preferably arranged so that the end of the flange part 58F is applied with a vibration due to an ultrasonic wave.

The first member 56 and the second member 58 sandwiched by the horn 70 and the anvil 71 as described above is subjected to ultrasonic pressure contact, thereby fixing the first member 56 and the second member 58 (S3).

The first member 56 and the second member 58 are applied with a pressure by a press. The pressure herein applied can be appropriately set according to the metal species and the dimensions of the first member 56 and the second member 58, and the shape of the horn 70, and the like. Although not limited thereto, the pressure to be applied to the first member 56 and the second member 58 can be set at, for example, about 200 to 1600 N.

Figure 8:
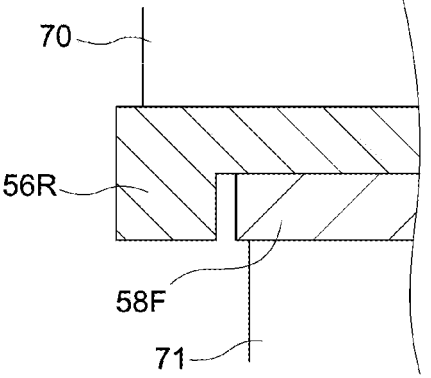
FIG. 8 is a cross sectional view schematically showing the state before crimping the first member and the second member by ultrasonic pressure contact.
Figure 9:
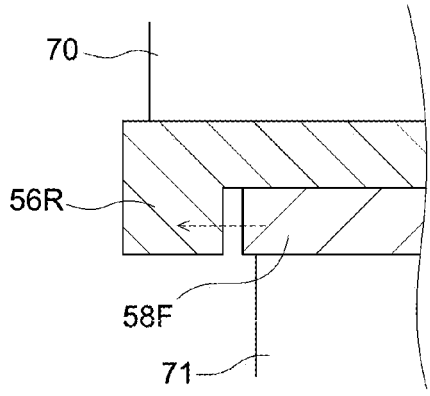
FIG. 9 is a cross sectional view schematically showing the state in which the first member and the second member are crimped by ultrasonic pressure contact.
Figure 10:
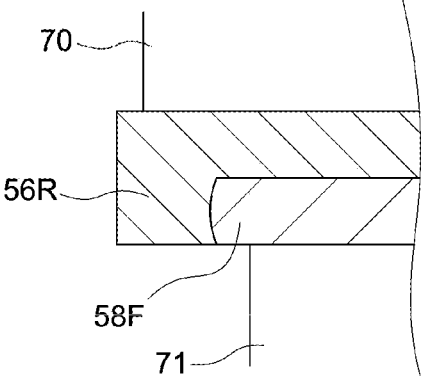
FIG. 10 is a cross sectional view schematically showing the state in which the first member and the second member have been crimped by ultrasonic pressure contact.

Then, with the first member 56 and the second member 58 applied with a pressure, an ultrasonic wave vibration is applied thereto via the horn 70. As shown in FIG. 8, before the first member 56 and the second member 58 are applied with an ultrasonic wave vibration, there is a gap between the inner wall surface of the concave part 56R and the end of the flange part 58F. By applying a vibration as shown in FIG. 9, the flange part 58F is extended with respect to the inner wall surface of the concave part 56R. As a result, as shown in FIG. 10, a part of the extended flange part 58F is brought into pressure contact with the inner wall surface of the concave part 56R, so that the first member 56 and the second member 58 are fixed to each other.

A metal joining can be formed at least a part of the opposing surfaces of the flange part 58F and the concave part 56R pressed against each other by being sandwiched by the horn 70 and the anvil 71.

The conditions for ultrasonic wave vibration herein applied via the horn 70 can be appropriately set according to the metal species and the dimensions of the first member 56 and the second member 58, the shape of the horn 70, and the like. Although not limited thereto, for example, the amplitude can be set at about 20 to 80 μm; the frequency, at about 15 to 150 kHz; and the energy amount to be applied to the first member 56 and the second member 58, at about 20 to 500 J.

By the manufacturing method described up to this point, it is possible to manufacture a terminal including the negative electrode connection terminal 54 herein disclosed as a constituent element.

Using the negative electrode connection terminal 54 manufactured through the foregoing steps, a battery assembly can be constructed (S4).

In this step, first, the electrode body 20, the nonaqueous electrolyte, the battery case 30, the positive electrode terminal 40, the negative electrode collector terminal 52, and the negative electrode connection terminal 54 are prepared. The battery case 30 includes a battery case main body 32 having an opening, and a lid body 34 having a liquid introduction port for introducing a nonaqueous electrolyte. The lid body 34 has through holes for allowing the positive electrode terminal 40 and the negative electrode connection terminal 54 to be inserted therethrough, respectively.

Then, the electrode body 20 is accommodated in the battery case 30.

The positive electrode terminal 40 is inserted through one through hole of the lid body 34 for mounting. The negative electrode connection terminal 54 is inserted through the other through hole of the lid body 34, and is connected with the negative electrode collector terminal 52, thereby mounting the negative electrode terminal 50 at the lid body 34.

The negative electrode connection terminal 54 and the negative electrode collector terminal 52 are connected with each other by a known method. Although not limited thereto, the connection between the negative electrode connection terminal 54 and the negative electrode collector terminal 52 may be established by crimping as shown in FIG. 5.

The positive electrode terminal 40 and the negative electrode collector terminal 52 are welded to the positive electrode collector exposed part 21C and the negative electrode collector exposed part 22C exposed at the end of the electrode body 20, respectively. Then, the electrode body 20 is accommodated through the opening into the inside of the main body of the battery case 30, so that the main body of the battery case 30 and the lid body 34 are welded.

Subsequently, a nonaqueous electrolyte is introduced through the introduction port. After introducing the nonaqueous electrolyte, the introduction port is sealed. As a result, a battery assembly can be obtained. The battery assembly is subjected to initial charging processing. As a result, a lithium ion secondary battery can be manufactured.

The negative electrode connection terminal 54 manufactured by the manufacturing method herein disclosed has the first member 56 and the second member 58 each made of a metal. The first member 56 is formed in a sheet shape, and has the concave part 56R at one surface thereof. The second member 58 has the flange part 58F to be accommodated in the concave part 56R of the first member 56. The first member 56 and the flange part 58F of the second member 58 are at least partially joined to each other by metal joining. In addition, the end of the flange part 58F is crimped with the inner wall surface of the concave part 56R not via the through hole.

Herein, the wording "the end of the flange part 58F is crimped with the inner wall surface of the concave part 56R" represents, for example, the following state: the end of the flange part 58F is in pressure contact with the inner wall surface of the concave part 56R; as a result, the first member 56 is fixed to the second member 58.

Figure 12:
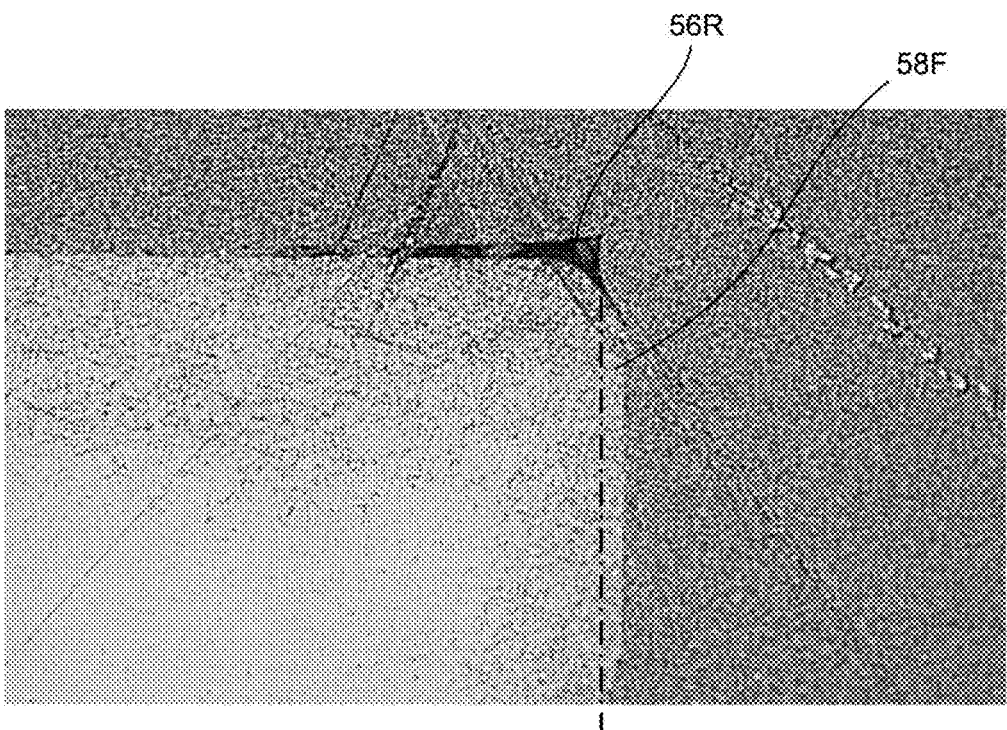
FIG. 12 is a cross sectional photograph showing the state in which the first member and the second member in accordance with one embodiment have been crimped.

FIG. 12 is a cross sectional photograph after ultrasonic pressure contact when aluminum is used for the first member 56, and copper is used for the second member 58. The dashed line in the drawing represents the position of the inner wall surface of the concave part 56R before performing ultrasonic pressure contact. It can be observed as follows: the end of the flange part 58F is extended, so that the flange part 58F is press-fitted to the inner wall surface of the concave part 56R.

The metal joining is caused at the opposing surfaces of the concave part 56R and the flange part 58F at the first member 56 and the second member 58, and, for example, can be caused at closer to a center of the flange part 58F than to the crimped part.

Figure 13:
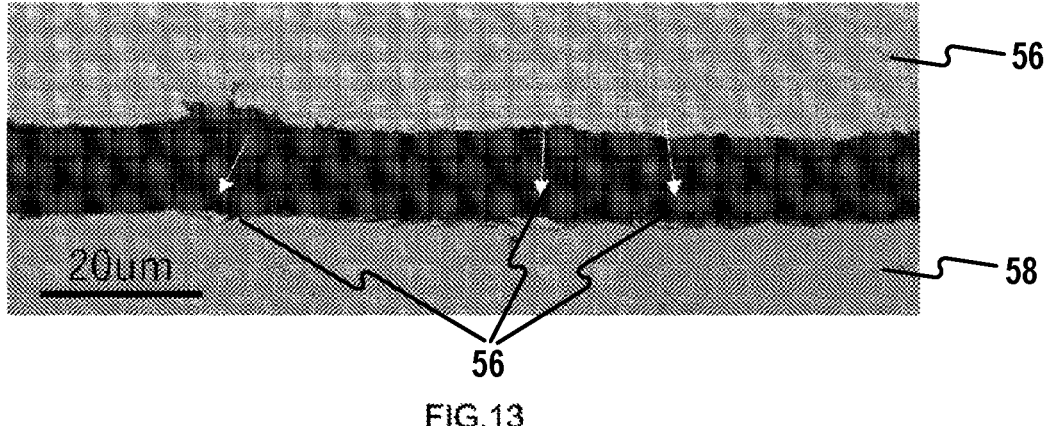
FIG. 13 is a scanning electron microscope (SEM) image of the cross section after rupture of the terminal in accordance with one embodiment.

In the present embodiment, the fact that a metal joining is caused between the first member 56 and the second member 58 can be confirmed, for example, by causing rupture at the interface between the first member 56 and the second member 58, and observing the ruptured surface. FIG. 13 is a SEM image of the surface resulting from rupture of the first member 56 including aluminum and the second member 58 including copper. The arrow in the drawing indicates the adhesion of the first member 56 including aluminum on the second member 58 including copper. When at least one ruptured surface of the first member 56 and the second member 58, adhesion of the other metal can be thus observed, it can be confirmed that there has been the joined surface.

The first member 56 and the second member 58 forming the negative electrode connection terminal 54 may be formed of mutually the same kind of metal. When the negative electrode collector 22A and the bus bar 14 are formed of mutually different metals, or in other cases, the first member 56 and the second member 58 are preferably formed of mutually different metals. In that case, it is preferable from the viewpoint of ensuring the conduction that the first member 56 and the bus bar 14 are formed of the same metal, and that the second member 58 and the negative electrode collector 22A are formed of the same metal.

With such a configuration, it is possible to improve the conduction and the junction strength of the negative electrode terminal 50 including the negative electrode connection terminal 54 and the bus bar 14.

For example, when the bus bar 14 to be connected with the negative electrode connection terminal 54 is formed of aluminum or an alloy mainly containing aluminum, and the negative electrode collector terminal 52 is formed of copper or an alloy mainly containing copper, preferably the first member 56 is formed of aluminum or an alloy mainly containing aluminum, and the second member 58 is formed of copper or an alloy mainly containing copper.

With such a configuration, it is possible to improve the conduction and the junction strength of the negative electrode terminal 50 including the negative electrode connection terminal 54, and the bus bar 14 to be connected with the negative electrode terminal 50.

Up to this point, specific examples of the present disclosure were described in detail. However, these are merely examples, and should not be construed as limiting the scope of the appended claims. The disclosure herein disclosed includes various modifications and changes of the specific examples.

What is claimed is:

1. A method for manufacturing a terminal forming any of a positive electrode and a negative electrode of a secondary battery, the method comprising the steps of:
   preparing a first member and a second member each made of a metal and forming the terminal,
   with the first member being formed in a sheet shape and having on one side thereof a concave depression formed as a blind hole extending into the one side but not extending through the first member for allowing a part of the second member to be positioned in the concave depression to rest against the first member along a bottom surface of the concave depression, wherein a circumferential groove extends radially outward from the bottom surface of the concave depression, and with the second member having an elongated shaft part terminating at one axial end in a flange part that extends radially outward from the one axial end of the elongated shaft part to be accommodated in the concave depression, wherein the elongated shaft part of the second member is configured to be inserted through a hole in a lid body of a battery case of the secondary battery with a second axial end of the elongated shaft part, the second axial end being opposite from the one axial end, the second axial end being configured to extend inside the battery case and including a leg part configured to be fixed to the lid body by crimping, and with the first member being configured to be disposed on an outside of the battery case with the concave depression facing the lid body; and fixing the first member and the second member to each other by ultrasonic pressure contact, with the ultrasonic pressure contact being performed by applying an ultrasonic wave vibration through a horn that is positioned to press against a side of the first member opposite from the one side having the concave depression formed therein while applying a pressure in a direction of stacking of the first member and the second member in a state where an anvil is positioned to press against a first side of the flange part of the second member, and a second, opposite side of the flange part of the second member is pressed against the bottom surface of the concave depression in the first member wherein the circumferential groove is filled by the flange part as it undergoes ultrasonic wave vibration, thereby extending the flange part radially outward with respect to an inner side wall surface of the concave depression and bringing an outer wall surface of the extended flange part into pressure contact with the inner side wall surface of the concave depression and press fitted into the circumferential groove.

2. The method for manufacturing a terminal according to claim 1,
  wherein the first member and the second member are formed of mutually different metals.

3. The method for manufacturing a terminal according to claim 2,
  wherein the first member is formed of aluminum or an alloy mainly containing aluminum, and the second member is formed of copper or an alloy mainly containing copper.

4. The method for manufacturing a terminal according to claim 1, wherein the ultrasonic pressure contact causes metal joining at an interface between the first member and the second member at a position closer to a center of the flange part of the second member than the portion of the outer wall surface of the extended flange part that is brought into pressure contact with the inner side wall surface of the concave depression formed in the first member.

5. The method for manufacturing a terminal according to claim 1, wherein the outer wall surface of the flange part is crimped with the inner side wall surface of the concave depression not via a through hole.

6. The method for manufacturing a terminal according to claim 1, wherein the elongated shaft part of the second member terminates at the one axial end in the first side of the flange part of the second member.

7. The method for manufacturing a terminal according to claim 1, wherein the anvil supports the flange part of the second member and the horn and the anvil are arranged to apply ultrasonic wave vibration to the outer wall surface of the flange part.

* * * * *